Aug. 8, 1961 C. S. SORKIN ET AL 2,995,694
IMPROVEMENT IN SERVO SYSTEMS
Filed Aug. 16, 1957 2 Sheets-Sheet 1

INVENTORS
CHARLES S. SORKIN
MELVIN E. ANNETT
BY Robert D. Sanborn
ATTORNEY

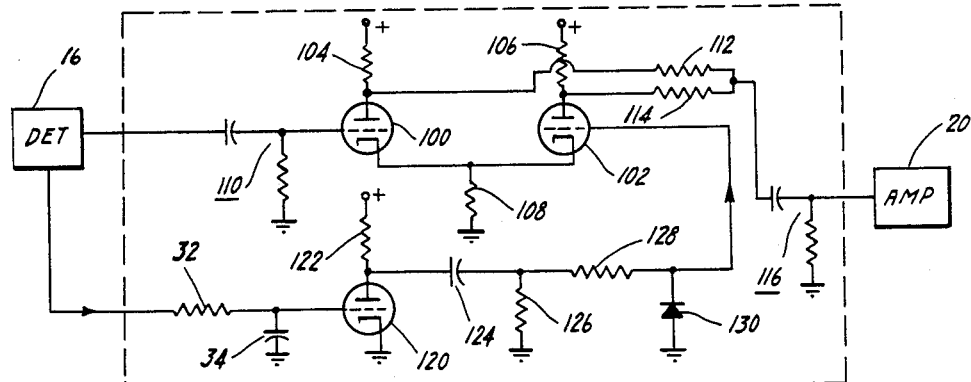
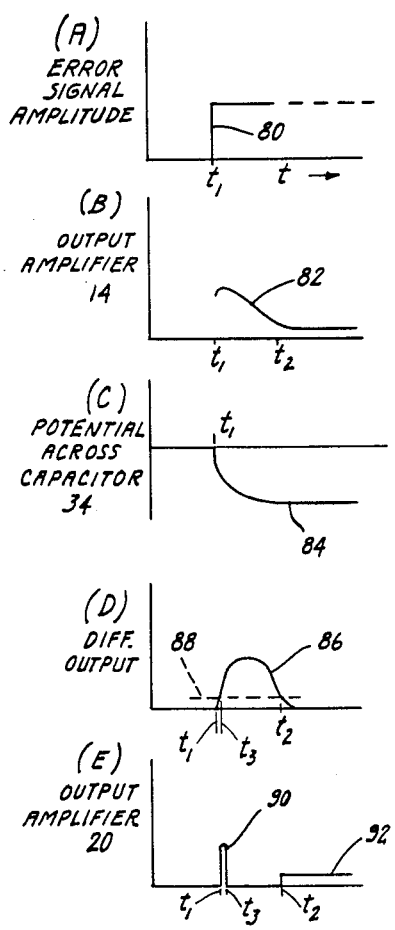
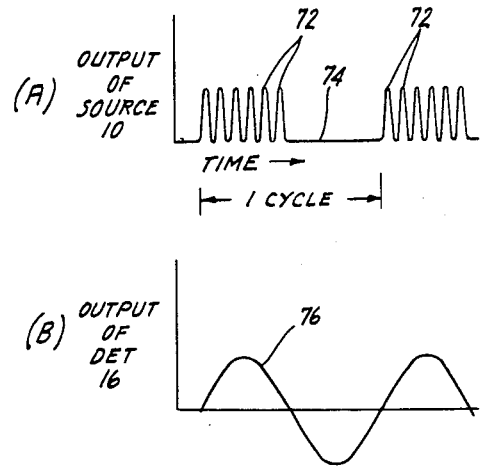
INVENTORS
CHARLES S. SORKIN
MELVIN E. ANNETT
BY Robert D. Sanborn
ATTORNEY

2,995,694
IMPROVEMENT IN SERVO SYSTEMS
Charles S. Sorkin, Philadelphia, and Melvin E. Annett, Bristol, Pa., assignors to Philco Corporation, Philadelphia, Pa., a corporation of Pennsylvania
Filed Aug. 16, 1957, Ser. No. 678,733
10 Claims. (Cl. 318—448)

The present invention relates to improvements in servo amplifier systems and more particularly to means for increasing the stability of closed loop servo systems.

Certain types of servo systems rely on the presence and phase of an error signal to control the operation of the servo system. The rate of response of such systems may be dependent upon the amplitude of the error signal but the amplitude of the error signal may be a function of some variable other than the amplitude of the tracking error. In systems of the type described it is usually necessary to employ an automatic gain control system to control the amplitude of the amplified error signal. However the inclusion of an automatic gain control circuit can cause the system to be highly unstable if the servo system has a null region or if the error signal is temporarily lost for any reason. If the normal error is temporarily lost the A.G.C. circuit cannot properly control the gain of the system and severe hunting may result when the error signal is restored. The following example will illustrate this point.

In certain types of optical tracking servo systems employed in missile guidance systems, an error signal is obtained by imaging an object to be tracked on a photocell. A disc having alternate transparent and opaque sections or spokes is interposed between the target and the photocell. The disc is rotated to provide an A.C. modulation component of the signal provided by the photocell. This A.C. modulation component is the error signal of the system. The presence and phase of the error signal will depend on the position of the target in space. The amplitude of the error signal will depend upon the intensity of the target image on the photocell. The intensity of the target image on the photocell will vary greatly with the illumination of the target, the reflectivity of the target and the range to the target. Systems of this type employ an automatic gain control (A.G.C.) circuit for maintaining the amplitude of the amplified error signal at optimum value for proper operation of the servo system. In order to preserve the desired modulation component, it is necessary that the A.G.C. circuit have a time constant long compared to the modulation frequency. This introduces an inherent time lag into the operation of the A.G.C. circuit.

Generally the rotating disc or light chopper is so constructed that there is a null or zero error region at the center. No error signal is produced by the photocell if the image of the target is located in this null region. The presence of this null region and the inherent and necessary time lag in the A.G.C. circuit may give rise to severe hunting in the presence of targets of high intensity. This hunting is caused in the following manner. If the system is tracking the target perfectly, the target image will lie in the null region and there will be no modulation of the energy falling on the photocell and hence no error signal. The absence of an error signal will cause the A.G.C. bias voltage to decrease and the gain of the amplifiers of the servo system to increase. If the target image now strays from the null region for any reason, the high gain of the amplifiers together with the high intensity of the target image will cause a very large amplified error signal to be generated. The long time constant of the A.G.C. circuit prevents this circuit from reducing the gain of the amplifier system immediately. The very large amplified error signal causes a large correction signal to be supplied to the positioning system which is a part of the servo system. This large correction signal causes the positioning system to be set into motion at a rate much greater than the normal tracking rate. As a result, the target image may move ballistically across the null region and reappear at the other side. The ballistic movement of the target image results from the fact that the inertia of this system maintains the system in motion for a short time after the error signal drops to zero. The error signal drops to zero as soon as the target image moves into the null region. The reappearance of the target image at the other side of the null region will result in a large error signal which is of the opposite sense or polarity to the first error signal. Again the positioning system is supplied with a large correction signal and the target image may again move ballistically across the null region. This cycle will be repeated until the large bursts of amplified error signal have increased the A.G.C. voltage to the point that the target image no longer moves entirely across the null region in response to an error signal. At this point the hunting will cease.

The fact that the target image is again in the null region and the error signal amplitude is again zero causes the A.G.C. voltage to again start to decrease. Therefore the entire cycle just described will repeat itself the next time that the target image strays from the null region as a result of some change in course on the part of the target or the missile or for any other reason. Thus the zero error condition is a condition of inherent instability in servo systems of the type described. Other forms of servo systems may exhibit similar instabilities as a result of sudden increases in error signal amplitude.

Therefore it is an object of this invention to provide means for suppressing jitter or hunting in closed loop servo systems.

It is another object of the present invention to provide means for suppressing the adverse effects on a tracking system of sudden increases in the amplitude of the error signal controlling such systems.

Still another object of the present invention is to provide means for causing a servo system to respond differently to sudden increases in amplitude of the error signal than it does to slow increases in amplitude of the error signal.

These and other objects of the invention are achieved by providing means in series with the servo loop for momentarily and automatically opening the loop at a point following the automatic gain control detector circuit in response to a sudden increase in the amplitude of the error signal and then reclosing the loop after the automatic gain control system has had time to function.

For a better understanding of the present invention together with other and further objects thereof reference should now be made to the following detailed description which is to be read in conjunction with the accompanying drawings in which:

FIG. 1A is a schematic diagram of a portion of the system of FIG. 1;

FIG. 4 is a series of waveforms which illustrate the operation of the error signal source of FIG. 2; and FIG. 5 is a series of waveforms which help to explain the operation of the system of FIG. 1.

Figure 1:
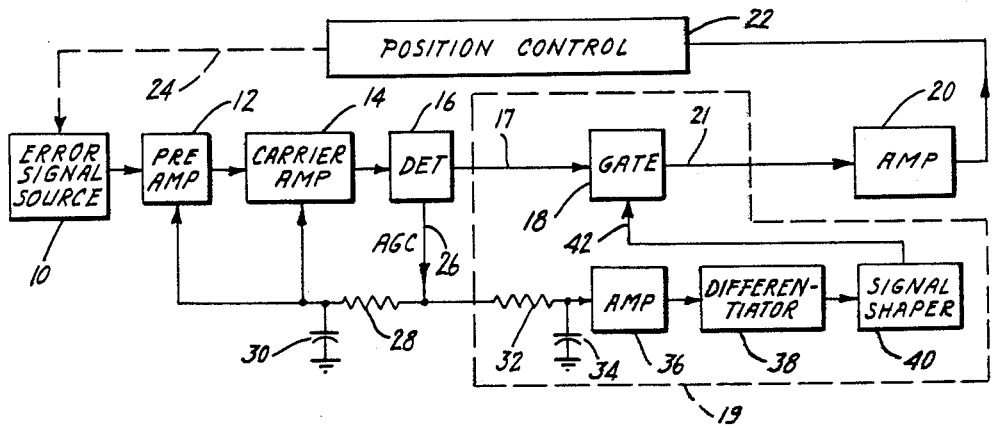
FIG. 1 is a block diagram of a servo system embodying the present invention.

In the system of FIG. 1 an error signal source 10 supplies error signals which are passed through the preamplifier 12 and carrier amplifier 14 to an error signal detector 16. As will be explained presently, the signals supplied by source 10 comprise an intermediate frequency signal which is modulated at a video frequency. Detector 16 extracts the modulation signal from the modulated intermediate frequency signal supplied by carrier amplifier 14. The detected error signal which appears at the output 17 of detector 16 is supplied through gate circuit 18 to an error signal amplifier 20. The output of amplifier 20 is connected to the input of a position control 22 which may include mechanical positioning means which respond to the control signals supplied by amplifier 20. These control signals are derived from and represent the error signals originally supplied by source 10. A link 24 is provided from position control 22 to error signal source 10 to provide feedback of information from the position control 22 to the error signal source 10 and thus close the servo loop. Link 24 may be electrical, mechanical or optical in nature. In the example chosen for illustration in the drawings, link 24 includes an optical system which provides the necessary feedback.

Detector 16 also provides an automatic gain control signal on lead 26 for controlling the gain of preamplifier 12 and carrier amplifier 14. This second signal is a unidirectional signal of negative polarity having an amplitude dependent upon the amplitude of the error signal supplied to gate 18. The signal from lead 26 passes through an integrator or filter composed of resistor 28 and capacitor 30. This filter provides the necessary time constant in the automatic gain control circuit. The signal appearing across capacitor 30 is a D.C. signal which varies only with relatively long term changes in peak amplitude of the error signal. That is, the potential across capacitor 30 varies much more slowly than the potential at lead 26 owing to the integrating action of the filter 28—30.

The novel means provided for controlling gate 18 will now be described. These means are all enclosed with the broken line 19 of FIG. 1. The signal appearing on A.G.C. lead 26 of detector 16 is supplied also to a second filter or integrator circuit composed of resistor 32 and capacitor 34. The signal appearing across capacitor 34 of this filter is supplied to the input of an amplifier 36 which feeds a differentiator circuit 38. The differentiated signal appearing at the output of differentiator 38 is supplied through a signal shaper 40 to the control input 42 of gate 18. Gate 18 is preferably a normally closed, balanced video gate circuit which is so arranged that the connection between detector 16 and amplifier 20 is broken in response to a signal supplied to input 42. A balanced gate circuit is employed so that the gating signal supplied to input 42 does not appear as a signal at the output 21 of gate 18.

The signal shaper 40 shown in FIG. 1 acts to square up the signal supplied by differentiator 38 and to prevent transient overshoots in the signal supplied by this circuit. In its simplest form, signal shaper 40 may comprise merely a diode connected between the output of differentiator 38 and ground to prevent a signal supplied by differentiator 38 from going negative with respect to ground. If more precise control of the signal level or time at which gate 18 operates is required other forms of signal shapers, such as multivibrators, may be employed.

It will be seen as the description of the invention proceeds that integrator 32—34, amplifier 36, differentiator 38 and signal shaper 40 together form means for supplying a control pulse to input 42 only upon the occurrence of a sudden increase in the A.G.C. signal on lead 26. No control pulse is supplied for gradual increases in the amplitude of the signal on lead 26 such as occur as the system approaches the target.

The circuit included within broken line 19 may take many forms. FIG. 1A shows one form that has been found to be satisfactory in a missile guidance system employing an error signal source of the type shown in FIG. 2. Broken line 19 in FIG. 1A corresponds to the similarly numbered line in FIG. 1. Detector 16 and amplifier 20 in FIG. 1A correspond to similarly numbered elements in FIG. 1. The gate circuit 18 of FIG. 1 is formed in FIG. 1A by two vacuum tubes 100 and 102 which have separate anode impedances 104 and 106 and a common cathode impedance 108. Signals from detector 16 are applied through a conventional R-C coupling network 110 to the control grid of tube 100. The anodes of tubes 100 and 102, respectively, are connected to the input of amplifier 20 by way of separate resistors 112 and 114 and the common coupling network 116. Resistors 112 and 114 and the common coupling impedance 116 form a linear signal adding circuit. The constants of the circuit thus far described are selected so that the point at the junction of resistors 112 and 114 does not change in potential for a signal supplied to the grid of tube 102 but does change in potential for a signal supplied to grid 100. This adjustment is possible for the reason that the signal supplied to one tube is coupled to the opposite tube in the inverse polarity through the common cathode impedance 108. The equivalent gain for this transfer is less than unity in either direction so that the equipotential point on the resistor combination 112, 114 is different for signals supplied to the grid of tube 100 than it is for signals supplied to the grid of tube 102.

The circuit for controlling the gate circuit just described receives its input signal from the filter 32—34 which is shown in FIG. 1 also. Amplifier 36 comprises a signal stage amplifier incorporating tube 120 and load impedance 122. Differentiator 38 of FIG. 1 comprises capacitor 124 and resistor 126 in FIG. 1A. In the circuit of FIG. 1A signal shaper 40 of FIG. 1 comprises a series resistor 128 and a diode 130. Diode 130 prevents the grid of tube 102 from going negative with respect to ground. The function of the various elements of FIG. 1A will become clearer as the description of the invention proceeds.

As indicated above, the present invention relates to means for stabilizing the operation of a servo loop against sudden changes of error signal amplitude whatever the cause of the sudden change may be. Therefore the present invention is not to be limited to any particular type of error signal source. Nevertheless it is necessary to understand the nature of the variations which may occur in a typical error signal before the advantages of the circuit of FIG. 1 can be fully appreciated. It is believed that this understanding can best be gained by describing in greater detail the typical error signal source mentioned above.

Figure 2:
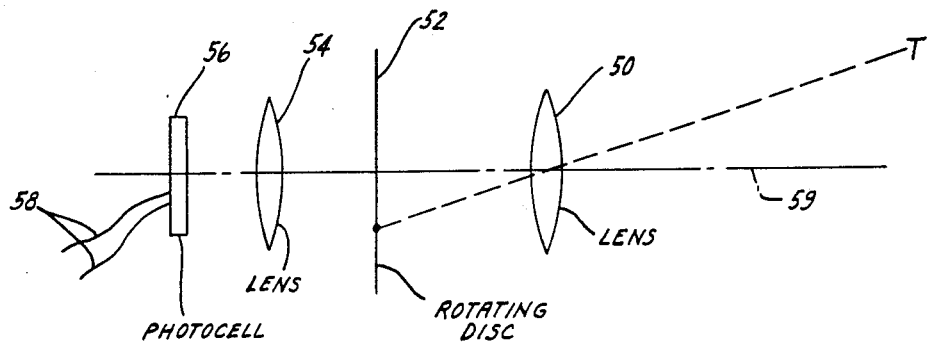
FIG. 2 is a view showing a form of error signal source.
Figure 3:
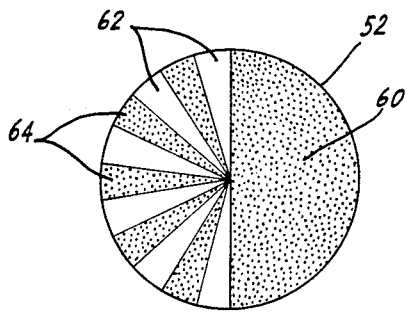
FIG. 3 is a view of a typical chopper employed in the error signal source of FIG. 2.

Turning to FIG. 2, the error signal source 10 may comprise a lens or mirror system 50 which images a target T on a rotating disc 52. Only an edge view of rotating disc 52 is shown in FIG. 2. A plan view of this disc is shown in FIG. 3. A second lens system 54 collects the light passing through disc 52 and concentrates this light on a photocell 56. The electrical leads 58 associated with the photocell 56 may be connected to the input of preamplifier 12 of FIG. 1. The entire optical assembly shown in FIG. 2 may be mounted on suitable bearings or gimbals so that it may be positioned by position control 22 of FIG. 1. The pull position, or zero tracking error position, of the optical system is normally the position in which axis 59 points directly at the target T.

FIG. 3 is a pan view of one type or rotating disc 52 which may be employed in the system of FIG. 2. One half 60 of disc 52 is opaque as indicated by the shaded area in FIG. 3. The other half of disc 52 is composed of transparent spokes 62 which alternate with opaque spokes 64.

FIG. 4A illustrates the output signal on the photocell 56 of FIG. 2 for a target located off the axis 59. The passage of the alternate transparent and opaque spokes 62, 64 in front of the target image causes the output signal of the photocell to occur as pulses 72 in FIG. 4A. The amplitude of pulses 72 is proportional to the intensity of the target image. A half revolution later, when the target image falls on the opaque section 60 of disc 52, there is no output on the photocell as indicated by region 74 of FIG. 4A. The resulting waveform shown in FIG.

4A may be considered to be made up of a continuous carrier frequency signal having a frequency equal to the repetition frequency of pulses 72 and an amplitude proportional to the amplitude of pulses 72 which has been 100% modulated by a square wave having one cycle in the interval shown in FIG. 4A. As will be shown later, the intelligence is represented by the phase of the square wave signal. The carrier component is introduced to facilitate amplification of the signal and to eliminate contamination of the error signal by thermal noise signals present at the output of photocell 58.

The modulated carrier frequency signal of FIG. 4A is amplified in preamplifier 12 and carrier amplifier 14 of FIG. 1. Detector 16 of FIG. 1 detects the square wave signal modulation component which corresponds to the envelope of carrier frequency pulses 72. Filter means may be employed in detector 16 to select only the fundamental component of this square wave envelope. This fundamental component is shown as sine wave 76 in FIG. 4B.

The square wave envelope, and hence the sinusoidal voltage 76 shown in FIG. 4B, has a phase which is determined by the position of target T relative to the axis 59. Therefore sine wave 76 may be compared with a reference voltage in position control 22 to provide an indication of the direction of the pointing error of the system of FIG. 2. For example, if waveforms of FIG. 4 represent the waveforms obtained with a target above the axis 59 of FIG. 2, a target below the axis 59 will produce pulses in the region 74 of FIG. 4A and no pulses in the region now occupied by pulses 72. Under these conditions the phase of signal 76 would be shifted 180° from that shown in FIG. 4B of the drawing.

Turning now to the operation of FIG. 1, suppose that the signal shown in FIG. 4A has been supplied to the input of amplifier 12 for several cycles of this waveform. The signals in the servo loop will have reached a steady state condition. The A.G.C. signal appearing on lead 26 will have reached a stable value and the potential appearing across capacitor 30 will have reduced the gain of preamplifier 12 and carrier amplifier 14 to the point where the signal 76 supplied to amplifier 20 is at the proper amplitude for optimum operation of the position control 22. Position control 22 will respond to the signal supplied thereto and will orient the optical system shown in FIG. 2 until axis 59 coincides with the target.

Suppose now that the axis 59 coincides with the target and that for a period equal to several cycles of the waveform 76 of FIG. 4B no error signal has been supplied from error signal source 10 to preamplifier 12. In the absence of a signal from carrier amplifier 14 the A.G.C. bias potential appearing across capacitor 30 will decay exponentially. As this A.G.C. bias potential decays the gain of preamplifier 12 and carrier amplifier 14 will become high. Suppose now that for some reason the axis 59 of the optical system moves out of alignment with the target T so that the target image is interrupted by spokes 62, 64 and opaque section 60. An error signal of the form shown in FIG. 4A will be supplied to preamplifier 12 and carrier amplifier 14. The signal at the output of carrier amplifier 14 will be at a very high amplitude owing to the high gain of preamplifier 12 and carrier amplifier 14. In prior art systems which do not include the circuit within broken line 19, the high amplitude signal to detector 16 results in a correspondingly high ampltiude signal being supplied to amplifier 20 and position control 22. This large correction signal supplied to position control 22 will cause a sudden large correction in the position of the optical system of FIG. 2. Axis 59 will move toward the target and the error signal supplied to amplifier 12 will diasappear. However, if the correction signal was sufficiently large, the optical system will continue to drift until the target image appears on the other side of the null. At this point a correction signal of the opposite polarity will be generated and the axis 59 of the optical system will be driven in the opposite direction, perhaps again with sufficient amplitude so that it appears on the other side of the null region of disc 52. As explained above, this hunting or jitter in a servo loop will continue until the A.G.C. bias potential appearing across capacitor 30 has had time to build up and reduce the gain of amplifiers 12 and 14.

The circuits enclosed within broken line 19 of FIG. 1 and shown in more detail in FIG. 1A act to eliminate this hunting or jitter in the servo loop. The sudden abrupt rise in error signal voltage which usually initiates the instability in the servo loop is represented by step 80 in FIG. 5A. Such a step, which occurs at the time designated as $t_1$, might result from a high intensity target image suddenly moving out of the null region of disc 52.

The amplitude of the signal at the output of carrier amplifier 14 is illustrated in FIG. 5B. FIG. 5B assumes that the error signal shown in 5A continues at constant amplitude form time $t_1$ to time $t_2$. As shown, the signal from amplifier 14 increases very rapidly at time $t_1$ but then decreases as the A.G.C. bias potential across capacitor 30 increases until a stable state is reached at approximately time $t_2$. It is to be understood that curve 82 of FIG. 5B represents the change with time of the peak amplitude of the envelope of a waveform which is similar to the one shown in FIG. 4A. Five or more cycles of the waveform of FIG. 4A may occur between times $t_1$ and $t_2$. The magnitude of the signal appearing at lead 26 will have the same variation with time as that shown in FIG. 5B. However this unidirectional potential is of negative polarity in order to develop a negative A.G.C. bias across capacitor 30.

The potential appearing across capacitor 34 as a result of the sudden increase in the amplified error signal is shown in FIG. 5C. Resistor 32 and capacitor 34 form an integrator circuit. Therefore the potential across capacitor 34 will start to become more negative at time $t_1$ and will follow a curve 84 which is similar to an exponential curve. However, curve 84 will increase less rapidly than a true exponential curve for the reason that the amplitude of the signal to detector 16 decreases owing to the increase in A.G.C. bias even though the error signal from source 10 remains constant.

The signal appearing at the output of amplifier 36 is similar to the curve shown at 84 in FIG. 5C except that it is inverted and of greater amplitude as a result of passing through amplifier 36. If the signal across capacitor 34 was a true sawtooth wave, the output of differentiator 38 would be a square wave. However, since the potential appearing across the capacitor 34 is neither a true sawtooth nor a true exponential but lies somewhere between the two, the signal at the output of differentiator 38 will be a pulse of the type shown at 86 in FIG. 5D. This pulse may have certain transient overshoots (not shown in FIG. 5D) which are minimized by signal shaper 40.

The characteristics of gate 18 are such that this gate is opened by the signal from differentiator 38 when this signal has an amplitude equal to or greater than that represented by the broken line 88 of FIG. 5D. Level 88 is reached by signal 86 at a time $t_3$ which occurs a very short interval after time $t_1$. Owing to the decrease in signal 82 and the reduction in slope of the signal appearing across the capacitor 34, level 88 is again reached by signal 86 at the time $t_2$.

During the interval $t_3$ to $t_2$ gate circuit 18 is open and no signal is passed from detector 16 to amplifier 20. Therefore, the signal appearing at the input of amplifier 20 will be as shown at FIG. 5E. As shown, a relatively large correction signal 90 occurs during the interval $t_1$ to $t_3$. The input to amplifier 20 is then zero from time $t_3$ to time $t_2$. When gate 18 closes owing to the drop in the amplitude of the signal supplied by differentiator 38, the amplitude of the signal supplied to amplifier 20 will be as shown at 92 in FIG. 5E. The amplitude of signal 92 is well below the amplitude of pulse 90 owing to the build-up of the A.G.C. bias potential during the interval $t_3$ to $t_2$. Preferably the amplitude of signal 92 is equal to or at least not much greater than the optimum tracking value of the system. The signal 92 will cause position control 22 to respond and reduce the tracking error to zero.

The operation of the specific circuit of FIG. 1A will be easily understood from the explanation just given. As explained above, the sudden increase in the amplitude of the error signal causes the potential across capacitor 34 to increase in the negative direction. This causes the potential at the anode of tube 120 to become more positive. The rise in potential at the anode of tube 120 is coupled through capacitor 124 and resistor 128 to the grid of tube 102. The positive signal on the grid of 102 causes the anode of this tube to become more negative and the cathode to become more positive. A positive potential on the cathode of 102 also appears as a positive potential on the cathode of tube 100. This positive potential at the cathode of tube 100 causes tube 100 to be cut off. Since tube 100 is cut off, no signal can be transferred from the grid of this tube to tube 102 or to the input of amplifier 20 by way of resistor 112. The balanced condition of the combining network 112, 114 and 116 prevents the gating pulse which appears at the grid of tube 102 from appearing at the input of amplifier 20.

If the output signal of amplifier 120—122 remains above its normal value, capacitor 124 will charge slowly through resistor 126 so that the potential appearing at the grid of tube 102 follows the waveform 86 in FIG. 5D. This is the normal action of a differentiator circuit. As a potential on the grid of tube 102 drops, the potential at the cathode of tube 100 will also drop, removing tube 100 from the cut-off condition. As soon as tube 100 is removed from its cut-off condition, coupling is restored from detector 16 to the input of amplifier 20.

By proper selection of the circuit constants the duration of pulse 90 can be made such that the correction provided by position control 22 is just sufficient to return the target image to the null region of disc 52 if this image moved out of the null region solely as a result of a slight drift in the optical system. As a result the error signal may be zero at the instant gate 18 recloses and no further signal will be supplied to amplifier 20 and position control 22.

Various modifications may be made in the circuit shown without departing from the present invention. For example differentiator 38 may be included in the circuit and signal shaper 40 may take the form of a multivibrator circuit which produces a rectangular pulse in response to the somewhat rounded pulse supplied by differentiator 38. It should be understood also that amplification may take place in the control loop either before or after differentiator 38.

The present invention may be embodied in other forms of servo systems. For example the error signal source 10 may take the form of a commutator or a control transformer. The error signal may be a D.C. signal or a signal at the supply frequency. The term "error signal" as used in the following claims refers to the input control signal to the servo system which causes the servo system to provide an output signal. The error signal may be generated by the comparison of two or more signals or conditions in the servo system or it may be generated by any suitable input control means without comparison with any other signal or condition.

Therefore while the invention has been described with reference to certain preferred embodiments thereof, it will be apparent that various modifications and other embodiments thereof will occur to those skilled in the art within the scope of the invention. Accordingly I desire the scope of my invention to be limited only by the appended claims.

What is claimed is:

1. A servo system comprising, in cascade, a source of error signals, means for amplifying said error signals, a normally closed gate means, and control means responsive to the amplified error signals, said servo system further comprising means for generating an automatic gain control signal dependent in amplitude on the amplitude of said amplified error signal, means for supplying said automatic gain control signal to said amplifying means to control the gain thereof, and means connected to said gate means and said automatic gain control signal generating means and responsive only to sudden increases in amplitude of said automatic gain control signal to cause said gate means momentarily to disconnect said control means from said error signal amplifying means.

2. A servo system comprising, in cascade, a source of error signals, means for amplifying said error signals, a normally closed gate means, and control means responsive to the amplified error signals, said servo system further comprising means for generating an automatic gain control signal dependent in amplitude on the amplitude of said amplified error signal, means for supplying said automatic gain control signal to said amplifier means to control the gain thereof, the combination of said two last-mentioned means having a time constant such that a predetermined time interval is required for the automatic gain control signal supplied to said amplifying means to re-establish an equilibrium value in response to a sudden increase in said amplified error signal voltage, and means connected to said gate means and said automatic gain control signal generating means and responsive only to sudden increases in amplitude of said automatic gain control signal to cause said gate means to disconnect said control means from said error signal amplifying means for a time interval substantially equal to said predetermined time interval.

3. A servo system comprising, in cascade, a source of error signals, means for amplifying said error signals, a normally closed gate means, and control means responsive to the amplified error signals, said servo system further comprising means for generating an automatic gain control signal dependent in amplitude on the amplitude of said amplified error signal, means for supplying said automatic gain control signal to said amplifier means to control the gain thereof, and means associated with said gate means and responsive only to sudden increases in amplitude of said amplified error signal for causing said gate means to disconnect said control means from said amplifying means for a selected interval following a sudden increase in the amplitude of said amplified error signal.

4. The system of claim 3 wherein said means associated with said gate means includes means for introducing a time delay between a sudden increase in amplitude of said amplified error signal and the disconnection of said amplifying means from said control means.

5. A servo system comprising, in cascade, a source of error signals, means for amplifying said error signals, gate means normally operative to pass a signal therethrough, and control means responsive to the amplified error signals, said servo system further comprising means for generating an automatic gain control signal having an amplitude dependent upon the amplitude of said amplified error signal, means for supplying said gain control signal to said amplifying means to control the gain thereof, means responsive to sudden increases in amplitude of said amplified error signal and relatively insensitive to slow increases in amplitude of said amplified error signal for producing a pulse of selected duration, and means for supplying said pulse to said gate means to cause said gate means to block the passage signals for substantially the duration of said pulse.

6. A servo system comprising, in cascade, a source of error signals, means for amplifying said error signals, a normally closed gate means, and a control means responsive to the amplified error signals, said servo system further comprising means for generating an automatic gain control signal dependent in amplitude on the amplitude of said amplified error signal, integrator means connecting said automatic gain control signal generating means to said amplifying means to control the gain of said amplifying means, and means including integrating means and differentiator means in cascade connecting said automatic gain control signal generating means to said gate means to control the operation of said gate means, said gate means being responsive to a signal from said last-mentioned means which exceeds a preselected amplitude for disconnecting said amplifying means from said control means.

7. A servo system comprising, in cascade, a source of error signals, means for amplifying said error signals, detector means, a balanced video gate circuit which is normally operative to pass signals, and control means, said detector means being arranged to supply at a first output connected to said gate a signal proportional to the amplitude of said amplified error signal and to supply at a second output an automatic gain control signal having an amplitude dependent upon the amplitude of said amplified error signal, integrator means connecting said second output of said detector means to said amplifier means thereby to control the gain of said amplifying means, and means including integrating means and differentiator means in cascade connecting said second output of said detector means to a control input of said gate means, said gate means being responsive to a signal from said last-mentioned means which exceeds a preselected amplitude for disconnecting said detector means from said control means.

8. A servo system comprising, in cascade, a source of error signals, means for amplifying said error signals, a normally closed gate means, and a control means responsive to the amplified error signals passed by said gate means, said servo system further comprising means for generating an automatic gain control signal dependent in amplitude on the amplitude of said amplified error signals, means for supplying said automatic gain control signal to said amplifier means to control the gain thereof, and means including integrating means and differentiator means in cascade connecting said automatic gain control signal generating means to said gate means to control the operation of said gate means, said gate means being responsive to a signal from said last-mentioned means which exceeds a preselected amplitude for disconnecting said amplifying means from said control means.

9. A servo system comprising, in cascade, a source of error signals, amplifying means for amplifying said error signals, and control means normally coupled to the output of said amplifying means and responsive to the amplified error signals supplied thereby, said servo system further comprising automatic gain control means responsive to said amplified error signals for providing an automatic gain control signal dependent in amplitude on the amplitude of said amplified error signals, means for supplying said automatic gain control signal to said amplifying means to control the gain thereof, and means responsive only to sudden increases in the amplitude of said amplified error signals for momentarily disconnecting said control means from said amplifying means.

10. A servo system comprising, in cascade, a source of error signals, amplifying means for amplifying said error signals, and control means normally coupled to the output of said amplifying means and responsive to the amplified error signals supplied thereby, said servo system further comprising automatic gain control means responsive to said amplified error signals for providing automatic gain control signal dependent in amplitude on the amplitude of said amplified error signals, means for supplying said automatic gain control signal to said amplifying means to control the gain thereof, and means responsive only to sudden increases in the amplitude of said automatic gain control signal for momentarily disconnecting said control means from said amplifying means.

References Cited in the file of this patent

UNITED STATES PATENTS

| | | |
|---|---|---|
| 2,159,822 | Seeley | May 23, 1939 |
| 2,252,066 | Dallos | Aug. 12, 1941 |
| 2,632,142 | Chenery | Mar. 17, 1953 |
| 2,673,314 | MacCallum | Mar. 23, 1954 |
| 2,751,543 | Alderson | June 19, 1956 |
| 2,869,063 | Hess | Jan. 13, 1959 |